July 1, 1958  S. C. ROCKAFELLOW  2,841,691
NEGATIVE FORGE TIMING FOR RESISTANCE WELDERS
Filed June 30, 1955  2 Sheets-Sheet 1

INVENTOR.
STUART C. ROCKAFELLOW
BY
ATTORNEY

INVENTOR.
STUART C. ROCKAFELLOW
ATTORNEY

United States Patent Office 2,841,691
Patented July 1, 1958

2,841,691

NEGATIVE FORGE TIMING FOR RESISTANCE WELDERS

Stuart C. Rockafellow, Farmington, Mich.

Application June 30, 1955, Serial No. 519,074

3 Claims. (Cl. 219—108)

This invention relates to a process for welding non-ferrous materials and more particularly to a process for welding including the step of varying the pressure exerted on material being welded during the welding operation.

While present welding processes have been acceptable for handling ferrous materials, such as steel, the application of welding processes to other metals, such as aluminum, titanium, magnesium and various alloys of these and other similar materials has been difficult because these materials are much more critical in their plastic ranges than ferrous materials and need more exact timing methods in order to obtain fusion of materials.

According to present practice, sufficient pressure is applied to the electrodes to cause them to bear against the work with sufficient force that the current can flow between the electrodes and through the work with a minimum of arcing.

Further, inasmuch as an increase in pressure exerted by the electrodes on the two parts of the work to be welded will diminish electrical resistance between such parts, it is well recognized that the more pressure that is applied to the electrodes, the less heat is developed in the materials. Thus, the amount of heat so developed can be regulated by regulating the pressure applied to the electrodes.

The term "squeeze" time, as is well known, refers to the time delay between the initiation of the entire welding cycle by the operator and the actual start of the welding current through the work piece. During this time the welding electrodes are squeezing together so that the proper pressure is being applied to the work piece when the welding current is started. The length of the squeeze time is controlled by a suitable timing device, hereinafter called the "squeeze timer." The total length of time, from the start of the current flow until the end of the current flow needed to make one weld, is called the "weld time." This time period is controlled by a suitable "weld timer."

With many metals, such as aluminum, titanium, magnesium and others similar thereto, it is sometimes desirable to increase or decrease the pressure exerted on the electrodes and thereby on the work piece during the weld time in order to secure a rapid and exact control over the heat pattern generated in the work. This action of increasing or decreasing the pressure exerted on and by the electrodes during the weld time is hereinafter referred to as "forging." Starting and stopping of the forging action is under the control of a "forge timer."

In the present practice, the welding current is caused to flow immediately after completion of the squeeze time. Further, in present practice, forging is commenced at a selected time after the beginning of the weld time. Sometimes an automatic switching arrangement is provided to start the forging timer at the same time the weld heat is applied. However, the build-up of forging action to a point where it is effecting the desired control over the heat pattern generated in the work also requires a measurable amount of time and, in cases of extremely short welding times, such as only a few cycles, the time required to build up a suitable forging pressure may exceed the time required for the weld. Thus, according to present practice the desirable control over heat patterns obtainable from variations in forging pressure is not always available and welding operations are handicapped accordingly.

To eliminate this problem, it is proposed to actuate the forge timer a fixed period of time prior to actuation of the weld timer. Preferably the squeeze time is divided into two periods, the first is a period of adjustable length and the second is a period of fixed length. The forge timer is started at the beginning of said second period rather than simultaneously with the beginning of the weld timer. The second period is of sufficient length to allow the forging pressure to build up to its operating limits before the welding current is fed to the electrode. Thus, whatever time is required for the mechanism causing the forging action to reach proper forging pressure, the mechanism is given time to act and it is therefore ready to carry out whatever functions are intended for it during the entirety of the weld time period. The length of the second period can be fixed so that the forging action can be commenced before, at or after the welding time period begins.

Accordingly, the major object of the invention is to provide a cycle of operational steps for carrying out a welding operation which steps will render said operation effectively applicable to any known welding cycle but particularly to welding operations in which the welding heat is applied for extremely short periods.

A further object of the invention is to provide a series of steps for a welding operation which is particularly applicable to the welding of aluminum, titanium, magnesium and other non-ferrous alloys.

A further object of the invention is to provide a series of operational steps for a welding operation wherein the forging step is initiated before the weld time begins.

A further object of the invention is to provide a process as aforesaid, having a squeeze time period including a fixed minimum time period, supplemented, if desired, by an adjustable additional squeeze time period and wherein the forging step is started simultaneously with the beginning of the fixed time period instead of the beginning of the weld time.

Other objects and purposes of this invention will be apparent to persons acquainted with welding operations upon a reading of the following specification and referring to the accompanying drawings.

Carrying out the purposes above set forth, I provide a timing cycle such that a short, as five cycle, fixed time interval is provided at the end of the squeeze cycle immediately ahead of the beginning of the weld time. The forging timer is commenced at the beginning of said fixed time period. An adjustable timing period, which may be adjusted as required, is also provided immediately preceding the fixed timing period. The sum of the fixed time period and the adjustable time period is the squeeze time of the process.

Figure 1:
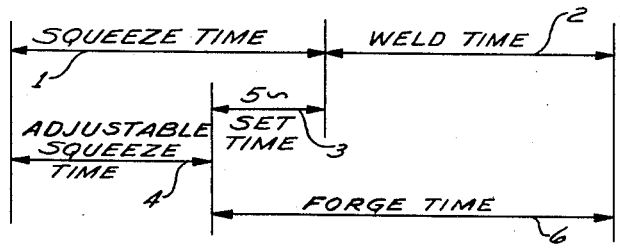
Figure 1 is a diagrammatic indication of the relationship of the steps constituting the welding operation.

Turning now to the drawings, attention is first called to Figure 1 wherein the steps of the invention are illustrated. The entire squeeze time, as above referred to and conventionally known, is illustrated by the line 1 and said squeeze time is followed, in the usual manner, by a weld time period indicated by the line 2. The squeeze time is made up by a fixed minimum period indicated by the line 3 and appearing immediately ahead of the weld time period, together with an adjustable squeeze time period indicated by the line 4, said adjustable period appearing immediately ahead of the fixed time period. The time during which the pressure is applied to the welding electrodes, the forging operation, is indicated by the line 6 shown as beginning ahead of the commencement of the weld time interval and extending to a period contemporaneous with the weld time period. The time interval by which the forge timer commences ahead of the weld time is preferably fixed and in the particular process here used for illustration, it commences simultaneous with the commencement of the fixed time portion of the squeeze time period.

In this manner, the apparatus by which the pressure on the welding electrodes is varied to effect the forging operations will have time to operate and will then be fully and effectively operable immediately upon commencement of the weld time period.

Figure 2:
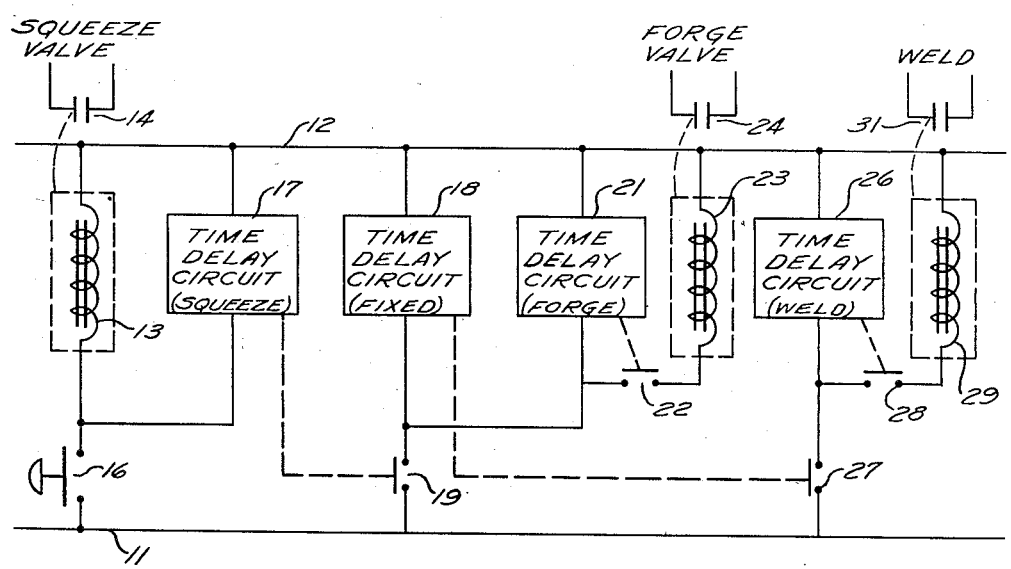
Figure 2 is a schematic indication of a typical control circuit for carrying out the operational steps of the invention.

Figure 2 illustrates in a generalized manner a circuit for carrying out the particular process illustrated in Figure 1. Here a pair of suitably energized bus conductors 11 and 12 have a plurality of timing components arranged therebetween. Only the portion of the circuit corresponding to the functions as shown in Figure 1 are here shown inasmuch as the components by which a weld time is terminated and the welding electrodes are opened is unnecessary to an understanding of the present invention.

The winding 13 of a relay whose contacts 14 control the pressure fluid valve which in turn controls the closing of the electrodes, is connected on the bus conductor 12 and through a starting switch 16 to the bus conductor 11. A time delay circuit 17 is connected from the side of the switch opposite the bus conductor 11 and to the bus conductor 12, whereby said time delay circuit 17 is energized simultaneously with the closing of the starting switch 16. The time delay circuit 17 is preferably adjustable and controls the variable squeeze timing operation illustrated by the line 4 in Figure 1.

A second time delay control circuit 18 is connected from the bus conductor 12 through the contacts 19 of a relay which is controlled by the time delay circuit 17, to the bus conductor 11. Thus, timing out of the timing circuit 17 will close the contacts 19 and commence operation of the second time delay circuit 18. A third time delay circuit 21 is connected from the bus conductor 12 to the side of the contacts 19 which are opposite the connection to the bus conductor 11. Thus, closing of the contacts 19 will also start the timing of the adjustable third time delay circuit 21. The second time delay circuit 18 is set for whatever fixed time interval, corresponding to line 3 in Figure 1, that it is desired to provide before beginning the welding cycle.

The third timing circuit 21 controls contacts 22. Contacts 22 control energization of the winding 23 of a relay whose contacts 24 control the solenoid effecting the forging operation. Timing out of the time delay relay 21 closes contacts 22 for energizing the winding 23 and thus actuating relay 24, thereby actuating the solenoid to cause the forging members to start the forging operation.

A fourth, or weld timing, circuit 26 is arranged between the bus conductors 11 and 12. Circuit 26 is energized by the closing of the contacts 27 in response to the timing out functioning of the fixed, or second, timing circuit 18. The fourth, or weld timing, circuit 26 itself closes the contacts 28 by which it energizes the winding 29 of the usual relay for closing the contacts 31 and thereby initiating any suitable circuitry for the application of welding heat.

As indicated above, the balance of the circuit, namely, that by which the welding heat is terminated, when its timing cycle is ended, the electrodes opened and apparatus returned to starting condition, are all conventional and form no part of the present invention.

Figure 3:
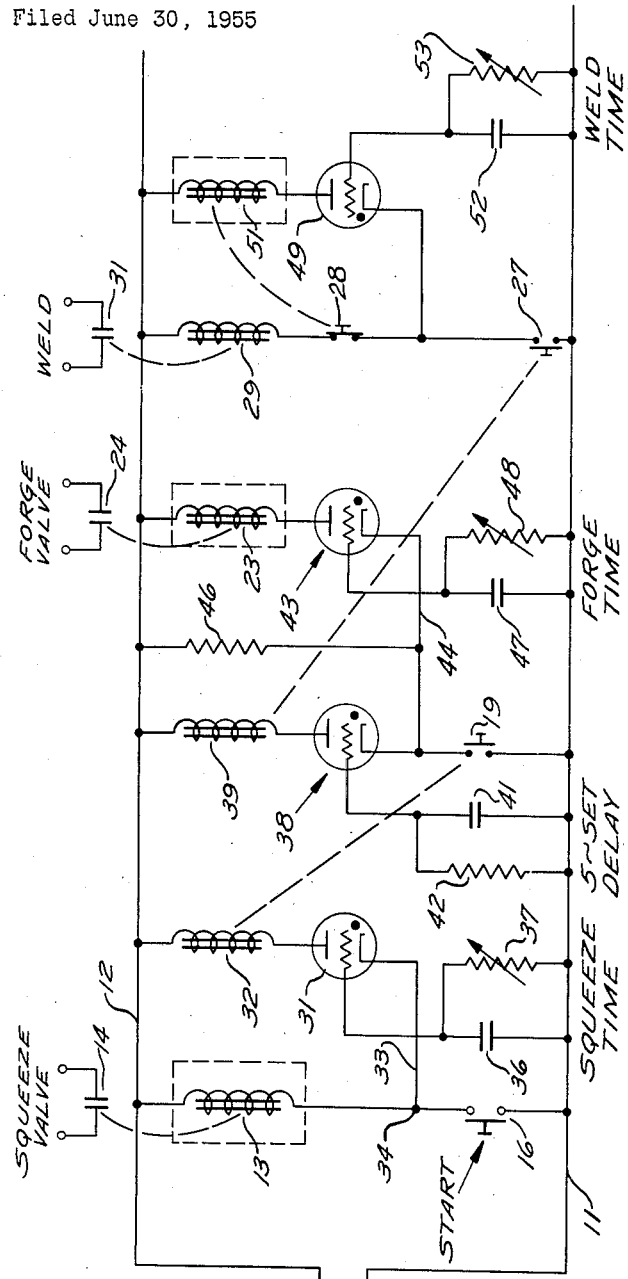
Figure 3 is a circuit diagram illustrating a preferred circuit for carrying out the process of the invention.

However, for the purposes of completeness in disclosure, in Figure 3 there is shown one specific circuit further illustrating the construction and functioning of the circuit schematically indicated in Figure 2 and carrying out the process illustrated in Figure 1.

Referring, then, to Figure 3, the conductors 11 and 12 are indicated in the same manner as in Figure 2, as well as the starting switch 16, the winding 13 and the contacts 14. However, the time delay circuit 17, appearing schematically in Figure 2, here appears as a thyratron 31 whose anode is connected through a winding 32 to the conductor 12 and whose cathode is connected through a conductor 33 to the junction point 34 located between the switch 16 and the winding 13. The control electrode of the thyratron 31 is connected to the bus conductor 11 through a control circuit consisting of a capacitor 36 and a variable resistance 37.

The time delay circuit 18 of Figure 2 appears in Figure 3 as a thyratron 38 whose anode is connected through a relay winding 39 to the bus conductor 12 and whose cathode is connected through the contacts 19 to the bus conductor 11. Said contacts 19 are responsive to the energization of the winding 32. The control electrode of the thyratron 38 is connected to the bus conductor 11 through a fixed time constant circuit consisting of a capacitor 41 and a resistor 42. The value of these components is chosen at such a point as to provide a fixed amount of delay between the termination of the timing interval controlled through the thyratron 31 and the energizing of the contacts by which is commenced the forging operation. In this particular embodiment, the components are chosen to provide a delay of five cycles.

The time delay circuit 21 of Figure 2 is in Figure 3 shown by the circuitry in connection with thyratron 43. This thyratron has its anode connected to the bus conductor 12 through the winding 23 of a relay with contacts indicated at 24. The cathode of said thyratron 23 is connected by a conductor 44 to the cathode of the thyratron 38 and the conductor 44 is also connected through a high resistance 46 to the bus conductor 12. The control electrode of the thyratron 43 is connected to a time control circuit comprising a capacitor 47 and a variable resistance 48.

The weld timing portion shown in Figure 3 comprises the winding 29 of a relay whose contacts are indicated at 31, a normally closed pair of contacts 28 and a normally open pair of contacts 27. Said components are connected in series between the bus conductors 11 and 12 and all appear in the circuit of Figure 2. The weld timing mechanism 26 of Figure 2 appears in Figure 3 as a thyratron 49 having its anode connected to the bus conductor 12 through a winding 51 of a relay whose contacts are the normally closed contacts 28. The cathode of the thyratron 49 is connected between the contacts 28 and the contacts 27. The control electrode of the thyratron 49 is connected to the bus conductor 11 through a time constant circuit consisting of the capacitor 52 and the variable resistor 53.

In the "at rest" condition of the apparatus, each of the thyratrons will be deenergized due to the open cathode circuit in each thereof.

Each of the capacitors will, however, be charged by grid to cathode conduction through each associated thyratron. The capacitor 36 will be charged through a path traceable through the winding 13, the conductor 33 and thence through the cathode and grid of the thyratron 31 and through the resistance 37. The voltage drop across resistance 37 will charge the capacitor 36. A similar charging of the capacitor 41 will occur by a path through the resistance 46, the cathode and grid of thyratron 38 and through the resistance 42. Similarly, the capacitor 47 will be charged by conduction along the path traceable through the resistance 46, the cathode and grid of the thyratron 43 and thence through the resistance 48. The capacitor 52 will be charged by current flow through the winding 29, the switch 28 the cathode and grid of the tube 49 and the resistance 53.

Closing of the switch 16, which will be assumed as accomplished manually but which may be accomplished by any other conventional means for this purpose, will effect closing of the contacts 14 and thereby closing of the welding electrodes. Closing of said switch will also place the cathode of the thyratron 31 at the potential of line 11 whereby to terminate the charging of capacitor 36 and to cause it to place a negative charge on the grid of thyratron 31, the potential of said charge having been determined by the rectifier action of the grid and cathode of the tube 31 in the charging of the capacitor 36. Discharging of said capacitor 36 through the resistance 37 will eventually permit conduction of the tube 31 which will effect an energizing of the winding 32 and a closing of the contacts 19. This is the end of the squeeze period indicated by line 4 of Figure 1 and the commencement of the forge timing indicated by line 6 of Figure 1.

Closing of the contacts 19 will place a potential across each of the thyratrons 38 and 43 and will bring the respective cathodes to the potential of the line 11 and thereby terminate the charging of the capacitors 41 and 47, respectively. As the capacitor 41 discharges, its blocking effect on the thyratron 38 will presently terminate and the winding 39 will become energized whereby to close the contacts 27. The resistance 42 being of a fixed character, the contacts 27 will close a fixed amount of time following the conduction of the thyratron 31. Discharging of the capacitor 47 through the variable resistance 48 will presently permit conduction of the valve 43 and thereby permit energization of the winding 23. Energization of said last named winding will close the contacts 24 and energize a suitable solenoid for imposing forging pressure upon the welding electrodes. The adjustable character of resistance 48 will thus cause the forging time to start simultaneous with the set time as indicated in Figure 1, or it may cause said forging operation to start at a selected point following the commencement of said set time.

Closing of the contacts 27 will energize the winding 29 and thereby close the contacts 31 effecting commencement of the welding current. Closing of said contacts 27 will also place the cathode of the tube 49 at the potential of the line 11 and thereby stop the charging of the capacitor 52. As said capacitor 52 discharges through the resistance 53, it will eventually render the tube 49 conductive and when same conducts it energizes the winding 51 and opens the contacts 28. Opening of said contacts terminates the welding current. The switch 16 may then be reopened manually or by a further electronic circuit of known character.

It will be evident that while particular circuits, both specific and generalized, have been utilized to illustrate the invention, a wide variety of other such means may be employed for carrying out the process of the invention and hence such process should be considered as the broad in scope and within the variations apparent with persons acquainted with the art excepting as said claims may be their own and expressed terms require otherwise.

I claim:

1. In a process for electrical resistance welding employing the steps of squeezing the welding electrodes together until they exert a substantially constant pressure on the work, passing a welding current through the welding electrodes and performing a forging operation by changing the pressure exerted on, and by, the welding electrodes during the passing of welding current, the preceding steps being of predetermined length and being performed in timed relationship to each other as the result of separate timing operations, the improvement in said process comprising the steps: initiating a timing operation for closing and squeezing the electrodes for an adjustable period of time constituting an initial squeeze period; terminating said initial squeeze period after a preselected passage of time and immediately thereafter starting a timing operation for controlling the forging operation and simultaneously starting a timing operation for a final squeeze period of fixed duration; terminating said timing operation for said final fixed squeeze period while continuing said timing operation for controlling the forging operation and thereupon starting a timing operation for controlling the passage of welding current through the welding electrodes.

2. In a process for electrical resistance welding employing the steps of squeezing the welding electrodes together until they exert a substantially constant pressure on the work, passing a welding current through the welding electrodes and performing a forging operation by changing the pressure exerted on, and by, the welding electrodes during the passing of welding current, the preceding steps being of predetermined length and being performed in timed relationship to each other as the result of separate timing operations, the improvement in said process comprising the steps: initiating a timing operation for closing and squeezing the electrodes for an adjustable period of time constituting an initial squeeze period; terminating said initial squeeze period after a preselected passage of time and operating switch means at the end of said passage of time to immediately thereafter start a timing operation for controlling the forging operation and simultaneously start a timing operation for a final squeeze period of fixed duration; terminating said timing operation for said final fixed squeeze period while continuing said timing operation for controlling the forging operation and operating switch means at the end of said final squeeze period to thereupon immediately sart a timing operation for controlling the passage of welding current through the welding electrodes.

3. In a process for electrical resistance welding employing the steps of squeezing the welding electrodes together until they exert a substantially constant pressure on the work, passing a welding current through the welding electrodes and performing a forging operation by changing the pressure exerted on, and by, the welding electrodes during the passing of welding current, the preceding steps being of predetermined length and being performed in timed relationship to each other as the result of separate timing operations, the improvement in said process comprising the steps: initiating a timing operation for closing and squeezing said electrodes for an adjustable period of time constituting an initial squeeze period; terminating said initial squeeze period after a preselected passage of time and operating switch means in response to the terminating of said initial squeeze period to immediately thereafter start a timing operation for controlling the forging operation and simultaneously start a timing operation for a final squeeze period of fixed duration: terminating said timing operation for said final fixed squeeze period while continuing said timing operation for controlling the forging operation and operating switch means in response to the terminating of said timing operation for said final fixed squeeze period to thereupon immediately start a timing operation for controlling the passage of welding current through the welding electrodes.

References Cited in the file of this patent
UNITED STATES PATENTS

| | | |
|---|---|---|
| 2,309,280 | Stansbury | Jan. 26, 1943 |
| 2,390,981 | Bivens | Dec. 18, 1945 |
| 2,459,041 | Mitsch | Jan. 11, 1949 |
| 2,476,882 | Lexa | July 19, 1949 |
| 2,623,146 | Anger | Dec. 23, 1952 |
| 2,785,284 | Van Ness et al. | Mar. 12, 1957 |